United States Patent Office 3,471,445
Patented Oct. 7, 1969

3,471,445
CURABLE URETHANE COMPOSITIONS
Donald R. Carr, Buffalo, N.Y., assignor to Allied Chemical Corporation, New York, N.Y., a corporation of New York
No Drawing. Filed June 27, 1966, Ser. No. 560,849
Int. Cl. C08g 22/04, 22/18
U.S. Cl. 260—75
12 Claims

ABSTRACT OF THE DISCLOSURE

Fluid, curable, urethane compositions having an extended pot life obtained by admixing a polymer selected from the group consisting of polyether polyols and polyester polyols with an excess of an organic polyisocyanate to form a first polyurethane prepolymer; admixing the first prepolymer with at least one organic diol having a molecular weight of less than 175, the amount of said diol being less than that which will react with all of the isocyanato groups in the first prepolymer, to form a second prepolymer; and, thereafter, admixing the second prepolymer with an aryl diamine chain extender.

---

This invention relates to curable urethane compositions having desirably long pot life. More particularly, it relates to curable urethane compositions and the prepolymers and chain extenders used therein.

The curable urethane compositions of this invention are fluid and pourable when prepared and remain so far extended periods. On hardening, these compositions produce urethane elastomers which comprise a well-known class of materials having varied applications. Such products can be cast or molded into intricate shapes and forms to produce such diverse articles as solid tires, anti-vibration mountings, impellers, propellers, bushings, bearings, shaft linings, gears, belts, protective equipment, helmet linings, gas masks, and the like.

It is well known in this art that urethane elastomers can be prepared by reacting an essentially linear polymer, such as a polyester or a polyether, having terminal hydroxyl groups, with an excess of an organic polyisocyanate, which on reaction with the hydroxyl groups of the polymer forms an essentially linear urethane prepolymer having free isocyanto (NCO) groups, and reacting this prepolymer with a bifunctional chain extender. This bifunctional additive, on reaction with the excess NCO groups of the urethane prepolymer, serves to cross link and/or extend the linear polymer chains to the point where the polymer becomes hard or rigid. Usually the combination of prepolymer and chain extender is accompanied by heat and/or pressure. This latter step may be referred to as the curing step.

The curing step is carried out by admixing, and preferably by thoroughly blending the prepolymer with the chain-extender usually at an elevated temperature. The mixture is then poured into suitable molds and hardened, i.e. cured by the application of heat and/or pressure, or the mixture can be masticated on heated rolls and formed into sheets.

It has been observed that the mixture of prepolymer and chain-extender remains in a fluid, pourable state for a relatively short period of time, i.e. the curable urethane composition has a relatively short "pot life," necessitating the preparation of such mixtures in small batches, which will fill only a small number of molds. Since a process is generally considered uneconomical unless it can be effected on a large scale, prior art processes involving prepolymer/chain-extender mixtures have been found to be expensive, time consuming, and inconvenient. Moreover, the short pot life of these curable compositions makes the filling of molds, especially those of intricate design, difficult and incomplete and it, further, results in the entrapment of gas bubbles in the thickened mass thus contributing to defective molds. Another observation has been that the curable urethane compositions will not remain sufficiently fluid to be poured into molds when the composition is maintained above ambient temperatures for extended periods. In view of the fact that temperatures above ambient are necessary for the satisfactory preparation of the prepolymer and cured elastomer, this inadequacy adds to the difficulties of attaining economical large scale production.

It is, therefore, an object of this invention to provide a process for the preparation of curable urethane compositions possessing a desirably long pot life.

Another object is to provide curable urethane compositions which harden readily at relatively low temperatures, yet, which remain in a fluid, pourable state for sufficient periods of time to permit adequate mixing of the urethane prepolymer and chain-extender and to allow the preparation of such compositions in relatively large quantities.

Other objects and advantages of this invention will be apparent from the following description.

I have made the surprising discovery that a curable urethane composition having a desirably long pot life can be prepared by a process comprising:

(a) Admixing a polymer selected from the group consisting of polyether polyols and polyester polyols with an excess of an organic polyisocyanate to form a first polyurethane prepolymer;

(b) Admixing the first prepolymer with at least one organic diol having a molecular weight of less than 175, the amount of said diol being less than that which will react with all of the isocyanato groups in the first prepolymer, to form a second prepolymer; and, thereafter, (c) Admixing the second prepolymer with an aryl diamine chain extender.

This unique combination of materials and steps provides a curable urethane composition with a pot life of at least two to three minutes and, generally, at least five minutes instead of the short pot lives barely measurable in seconds typical of prior art compositions. The curable urethane compositions of this invention remain sufficiently fluid to be poured into molds even when maintained above ambient temperatures for extended periods.

The process of this invention can be carried out by reacting a hydroxyl terminated polymer, e.g. a polyester polyol having a molecular weight of at least about 1000 and a hydroxyl number of at least about 40, with an excess of a polyisocyanate to form a first prepolymer and, thereafter, reacting the resulting urethane prepolymer with an organic diol having a molecular weight below about 175, such as ethylene glycol, propylene glycol, butylene glycol, hexylene glycol, and the like, in an amount sufficient to react with only a portion of the free isocyanato groups of the first prepolymer to form a second prepolymer. The second prepolymer is then intimately mixed with a conventional chain-extender to form a curable urethane composition, which has a pot life, which, at temperatures above ambient, is substantially longer than curable urethane compositions prepared in a similar manner, but without using the organic diol to form the second prepolymer.

In accordance with a preferred mode for carrying out the process of this invention, 100 parts of a polyester polyol, derived in a known manner by esterification of adipic acid with an excess of ethylene and propylene glycols, having a molecular weight of about 2000, a hydroxyl number of about 50, and an acid number below about 5, is heated to about 45° to 50° C. To the polyester are added about 24 to 25 parts of an 80% to 20% mixture of 2,4- and 2,6-tolylene diisocyanates. The mixture is heated to and maintained at about 80° C. for about 3 hours and then about 4.5 parts of ethylene glycol are added dropwise to the urethane mixture. The mass is held at about 80° C. for about 2 hours, or until the free isocyanate content decreases to about 4% free NCO. Subsequently this urethane prepolymer is heated to about 110° C. and intimately mixed with an amount of molten (110° C.) 4,4'-methylene-bis-(2-chloroaniline). This mixture then can be poured into a mold preheated to about 130° C. Pot life of the curable composition can be determined by inserting a wooden tongue depressor into the hot mixture and removing the depressor. When the void made by the depressor, does not disappear, the mixture is no longer pourable and the pot life period can be said to have ended. The composition when poured into the preheated mold can be cured in any known manner, for example, it can be heated at 275° F. under 40,000 p.s.i.g. for 10 minutes and thereafter post cured for 3 hours at 130° C. The resultant cured urethane elastomers obtained from the compositions of this invention possess excellent physical properties, such as high tensile strength, hardness, resistance to solvents, abrasion resistance, and the like.

Typically, preparation of the first and second prepolymers take place at temperatures of about 60° C. to about 100° C. and preferably about 75° C. to about 85° C.; the temperature at which the chain extender is added is at about the melting point of the chain extender where it is a solid or at the lower prepolymer temperatures where the chain extender is a liquid; and the time of reaction ranges from about one to about five hours for each prepolymer step and preferably about two to about four hours.

The hydroxyl terminated polymer used to prepare the urethane prepolymer can be a polyester polyol (including polyesteramide polyols) or a polyether polyol (including polyether thiols). Preferably these polyols are essentially linear in character and have a functionality of about 2.

The polyester polyols, as a class, are well known and can be prepared by conventional means. For example such polyesters can be prepared by condensing one or a mixture of dibasic acids with one or a mixture of glycols. Typical of the suitable dibasic acids are succinic glutaric, adipic, pimelic, suberic, azelaic, subacic, and terephthalic acids. Typical of the glycols which can be used are ethylene glycol, 1,2- and 1,3-propylene glycols, 1,4-butylene glycol, hexamethylene glycol and the like. Polyesters derived from adipic acid and a mixture of methylene and 1,2-propylene glycols are preferred. The polyesters can have an average molecular weight of at least 500, and preferably between 1000 and 2500, a hydroxyl number between about 40 and 115, and preferably between 50 and 70, and a low acid number, preferably below 5.

The polymer polyol can also be a polyether polyol, of which broad class, the polyalkylene ether glycols are typical members. These glycols are well known in this art, several members being available commercially, and are believed to have the general formula:

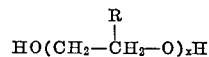

wherein R is hydrogen or a lower alkyl group and $x$ is an integer of such magnitude that the molecular weight of the polyether glycol is at least about 500 and preferably within the range of 1000 and 2500. Suitable glycols of this class include: polyethylene ether glycol, polypropylene ether glycol, and polybutylene ether glycol. Polyether glycols of this class can be obtained by condensation of an alkylene oxide or mixture of alkylene oxides, such as ethylene oxide, propylene oxide and the like as well as mixtures thereof, with a polyhydric alcohol such as ethylene glycol in the presence of a suitable catalyst, e.g. trimethylamine, potassium hydroxide, and the like. The preparation of such polyalkylene ether glycols is well known in this art.

Any of a wide variety of organic isocyanates can be used to react with the polymeric polyols in the formation of the urethane prepolymer. Thus aromatic, aliphatic and cycloaliphatic isocyanates can be used. Liquid aromatic diisocyanates are preferred. As examples of this well known class of reactants, the following are mentioned: 1,4-phenylene diisocyanate, 2,4-tolylene diisocyanate, 2,6-tolylene diisocyanate, 1,5-naphthalene diisocyanate, 4,4'-methylene-bis-(phenylisocyanate), cumene - 2,4-diisocyanate, 4-methyl - 1,3 - cyclohexyldiisocyanate, 4,4'-methylene - bis - (cyclohexylisocyanate), 1,6-hexamethylene diisocyanate, and polyalkylene-polyaryl polyisocyanates such as those disclosed in U.S. Patent 2,683,730.

Mixtures of these and equivalent isocyanates can be employed also if desired. Especially preferred is the commercially available mixture of about 80% 2,4- and about 20% 2,6-tolylene diisocyanates in pure or crude form.

The polymer polyol and polyisocyanate are combined in proportions such that an excess of isocyanate is used. Preferably, at least three isocyanato groups are added for each hydroxyl (or other active hydrogen) group present in the polyol; however, as few as 2.5 and as many as six isocyanato groups per hydroxyl group can be used.

The first prepolymer composition which contains terminal isocyanato groups, and can also contain free diisocyanate, is thereafter reacted with a lower molecular weight diol. This procedure removes a portion, but not all, of the free isocyanato groups. Examples of suitable diols which can be used for this purpose are: ethylene glycol, 1,2-propylene glycol, 1,3-propylene glycol, 1,4-butylene glycol, diethylene glycol, dipropylene glycol, 1,4-butane diol, and mixtures of these and equivalent lower molecular weight diols. Where mixtures are used, the diols can either be used in admixture or added one at a time allowing each to react substantially with the first prepolymer. The molecular weight of the organic diol should be less than 175. Preferred diols within this molecular weight range are alkylene diols having from two to six carbon atoms.

The amount of organic diol which can be used must be less than the amount of diol which will react with all of the free NCO groups present in the first prepolymer. The second prepolymer can contain about 1.5% to about 10% by weight of free NCO groups and preferably contains about 3% to about 5% free NCO groups.

The chain extender, which is sometimes referred to as a "hardener" is thought to react with the prepolymer by a cross-linking mechanism thereby giving rise to a stiffening of the polymer chain. The aryl diamines, which are preferred herein, produce elastomers of excellent tensile strength, hardness, and other physical characteristics and hence are widely used. Typical examples of the aryl diamines are the following: 4,4'-methylene-bis-(2-chloroaniline), 4,4'-methylene - bis - (2-bromoaniline), 4,4'-methylene - bis - (2-methoxyaniline), 4,4'-methylene-bis-(2-hexylaniline), 4,4'-methylene-bis-(2-ethylaniline), 1,5-napthalene diamine, 2,2'-dichlorobenzidine, and dianisidine. Mixtures of these and equivalent aryl diamines are contemplated. The chain-extender is added to the second prepolymer in an amount within the range of about 80% to about 100% of the amount theoretically required to react with all of the free NCO groups of the second prepolymer.

As illustrated hereinbelow, it has been found that the curable urethane compositions of this invention not only have a pot life which, at temperatures above ambient, is substantially longer than curable urethane compositions prepared in a similar manner but without using the organic diol to form a second prepolymer, but additionally have a pot life substantially longer than those compositions prepared when the organic diol is employed in admixture with the chain extended without forming a second prepolymer.

The following examples will illustrate the present invention and include the best mode presently known of carrying it out. It should be emphasized, however, that the examples given herein, are purely illustrative in character and this invention is not to be limited to the details set out therein since variations in said details are possible without departing from the scope or spirit of the invention as will be obvious to those skilled in this art. Parts and percentages are by weight.

EXAMPLE I

To 248 parts of polyethylene adipate having an average molecular weight of 1810 and a hydroxyl number of 62, preheated to about 60° C., 124 parts of a mixture of about 80% 2, 4- and about 20% 2,6-tolylene diisocyanates were added. The resulting mass was heated to and maintained at 80° C. for about 3 hours to form a prepolymer having an amine equivalent of 342 and 12.3% free NCO. To the resulting prepolymer, 22 parts of ethylene gylcol were added dropwise and the mixture was heated at 80° C. for two additional hours to form a second prepolymer containing 4.13% free NCO.

A curable urethane composition was prepared by blending 70 parts of this prepolymer with 8.25 parts of 4,4'-methylene-bis-(2-chloroaniline) at 110° C. The pot life of this composition was 5½ minutes or 330 seconds. (Pot-life was determined by pouring the mixture into a mold preheated to 130° C. and carefully observed. The elapsed time from the mixing of the components until the composition was no longer fluid was taken as the pot life. The fluidity of the mixture was determined by inserting a wooden tongue depressor into the curable composition. When the void formed by inserting and removing the depressor does not disappear, the mixture is said not to be fluid.)

EXAMPLE II

The procedure of Example I was repeated with the exception that no second prepolymer was formed, e.g. ethylene glycol was omitted and 8.25 parts of 4,4'-methylene-bis(2-chloro-aniline) were added to 70 parts of the first prepolymer containing 12.3% free NCO. The pot life of the curable urethane composition of this example was found to be about 5 seconds.

EXAMPLE III

The procedure of Example I was repeated except that to 70 parts of the first prepolymer containing 12.3% free NCO, a mixture of 4.15 parts of ethylene glycol and 8.25 parts of 4,4'-methylene-bis-(2-chloro-aniline) were added. The pot life of the curable urethane composition of this example was found to be about 15 seconds.

EXAMPLE IV

The procedure of Example I was followed except that 500 parts of polyethylene adipate ester, 205 parts of isocyanate and 35 parts of ethylene glycol were used; the second prepolymer was found to contain 3.6% free NCO; the second prepolymer was mixed with an amount of 4,4'-methylene-bis-(2-chloro-aniline) theoretically equivalent to 90% of the free NCO. The pot life was about 7 minutes and the Shore Hardness (A) was found to be 94.

EXAMPLE V

The procedure of Example I was repeated except that 500 parts of polyethylene adipate ester, 24.7 parts of ethylene glycol, 27.5 parts of 1,4-butane diol, and 4 hours were used in the preparation of the second prepolymer. The second prepolymer was found to contain 4.0% free NCO and the pot life was 5½ minutes.

It can thus be seen that an effective means of preparing curable urethane compositions with desirably long pot life has been provided. This method, which is simple to execute, does not require any unusual or expensive apparatus or components and is applicable to a more efficient preparation of urethane elastomers on a large scale.

I claim:

1. A process for preparing a fluid curable urethane composition having an extended pot life comprising:
   (a) admixing a polymer selected from the group consisting of polyether polyols and polyester polyols having an average molecular weight of at least 500 with an excess of an organic polyisocyanate to form a first isocyanato-terminated polyurethane prepolymer;
   (b) admixing the first prepolymer with at least one organic diol having a molecular weight of less than 175, the amount of said diol being less than that which will react with all of the isocyanato groups in the first prepolymer, to form a second isocyanato-terminated prepolymer; and, thereafter,
   (c) admixing the second prepolymer with an aryl diamine chain extender.

2. The process as defined in claim 1 wherein the polymer used in step (a) is a polyether polyol.

3. The process as defined in claim 1 wherein the polymer used in step (a) is a polyester polyol.

4. The process as defined in claim 2 wherein the polyether polyol has a molecular weight from about 500 to about 2500.

5. The process as defined in claim 3 wherein the polyester polyol has a molecular weight from about 500 to about 2500.

6. The process as defined in claim 1 wherein the NCO/OH ratio in step (a) is about 2.5/1 to about 6/1.

7. The process as defined in claim 6 wherein the second prepolymer contains about 1.5% to about 10% by weight of free isocyanato groups.

8. The process as defined in claim 7 wherein the organic diol has from 2 to 6 carbon atoms.

9. The process as defined in claim 8 wherein the aryl diamine chain extender is used in an amount within the range of about 80% to about 100% of the amount theoretically required to react with all of the free NCO groups of the second prepolymer.

10. The process as defined in claim 9 wherein the chain extender is 4,4'-methylene-bis-(2-chloroaniline).

11. A fluid curable urethane composition having an extended pot life prepared by a process comprising:
   (a) admixing a polymer selected from the group consisting of polyether polyols and polyester polyols having an average molecular weight of at least 500 with an excess of an organic polyisocyanate to form a first isocyanato-terminated polyurethane prepolymer;
   (b) admixing the first prepolymer with at least one organic diol having a molecular weight of less than 175, the amount of said diol being less than that which will react with all of the isocyanato groups in the first prepolymer, to form a second isocyanato-terminated prepolymer; and, thereafter,
   (c) admixing the second prepolymer with an aryl diamine chain extender.

12. The curable urethane composition defined in claim 11 wherein the polymer used in step (a) has a molecular weight of about 500 to about 2500; the NCO/OH ratio in step (a) is about 2.5/1 to about 6/1; the second prepolymer contains about 1.5% to about 10% by weight of free isocyanato groups; the organic diol has from 2 to 6 carbon atoms; and the aryl diamine chain extender is 4,4'-methylene-bis-(2-chloroaniline).

References Cited

UNITED STATES PATENTS

| | | | |
|---|---|---|---|
| Re. 24,514 | 8/1958 | Hoppe et al. | 260—2.5 |
| 3,188,302 | 6/1965 | Lorenz | 260—77.5 |

DONALD E. CZAJA, Primary Examiner

M. J. WELSH, Assistant Examiner

U.S. Cl. X.R.

260—77.5